(12) United States Patent
Valero Lafuente et al.

(10) Patent No.: US 9,759,329 B2
(45) Date of Patent: Sep. 12, 2017

(54) SEALING ASSEMBLY

(71) Applicant: Alstom Renovables España, S.L., Barcelona (ES)

(72) Inventors: Sebastian Valero Lafuente, Cornellà De Llobregat (ES); Jesús Lorita, Badalona (ES); Javier Bescos, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 559 days.

(21) Appl. No.: 14/356,599

(22) PCT Filed: Nov. 16, 2012

(86) PCT No.: PCT/EP2012/072836
§ 371 (c)(1),
(2) Date: May 6, 2014

(87) PCT Pub. No.: WO2013/072460
PCT Pub. Date: May 23, 2013

(65) Prior Publication Data
US 2014/0301848 A1     Oct. 9, 2014

Related U.S. Application Data

(60) Provisional application No. 61/587,307, filed on Jan. 17, 2012.

(30) Foreign Application Priority Data

Nov. 17, 2011   (EP) ..................................... 11382353

(51) Int. Cl.
*F16J 15/00*   (2006.01)
*F16J 15/16*   (2006.01)
(Continued)

(52) U.S. Cl.
CPC .............. *F16J 15/16* (2013.01); *F03D 80/00* (2016.05); *F03D 80/70* (2016.05);
(Continued)

(58) Field of Classification Search
CPC ....... F03D 80/00; F03D 80/70; F16J 15/3288; F16J 15/4476; F05B 2240/571
(Continued)

(56) References Cited

U.S. PATENT DOCUMENTS 6,010,132 A    1/2000  Bagepalli et al.
6,390,476 B1 * 5/2002  Tong ...................... F16J 15/442
                                                  277/355

(Continued)

FOREIGN PATENT DOCUMENTS

EP    2 154 361    2/2010
EP    2 306 009    4/2011
(Continued)

OTHER PUBLICATIONS

International Search Report for PCT/EP2012/072836, mailed Feb. 27, 2013, 10 pgs.

*Primary Examiner* — Kevin Murphy
(74) *Attorney, Agent, or Firm* — Dority & Manning, P.A.

(57) ABSTRACT

It comprises a first member with a plate attached and substantially covering at least one portion of a second member (20), both members being rotatable relative to each other and defining a tortuous way, and it further comprises a brush sealing attached to the first member and resting on a siding plate in the second member such that an inner gap formed between said first and second members is sealed. A flexible member may be provided between the brush sealing and the first member for joining them in a flexible way.

13 Claims, 3 Drawing Sheets

(51) Int. Cl.
  *F03D 80/70* (2016.01)
  *F16J 15/3288* (2016.01)
  *F16J 15/447* (2006.01)
  *F03D 80/00* (2016.01)

(52) U.S. Cl.
  CPC ....... *F16J 15/3288* (2013.01); *F16J 15/4476* (2013.01); *F05B 2240/571* (2013.01); *Y02E 10/726* (2013.01)

(58) Field of Classification Search
  USPC .......................................... 416/174; 277/355
  See application file for complete search history.

(56) References Cited

U.S. PATENT DOCUMENTS

| | | | |
|---|---|---|---|
| 6,808,180 B2* | 10/2004 | Shore | F16J 15/3288 277/355 |
| 6,840,518 B2* | 1/2005 | Boston | F16J 15/3288 277/355 |
| 2002/0020968 A1* | 2/2002 | Gail | F16J 15/3288 277/355 |
| 2003/0006559 A1* | 1/2003 | Inoue | F16J 15/3288 277/355 |
| 2008/0224415 A1* | 9/2008 | Flaherty | F16J 15/3288 277/355 |
| 2008/0246224 A1 | 10/2008 | Pabst et al. | |
| 2008/0258403 A1* | 10/2008 | Beichl | F01D 11/001 277/355 |
| 2010/0135607 A1* | 6/2010 | Rogall | F16C 33/76 384/477 |
| 2011/0138963 A1 | 6/2011 | Pischel | |

FOREIGN PATENT DOCUMENTS

| | | |
|---|---|---|
| EP | 2 320 081 | 5/2011 |
| EP | 2 339 172 | 6/2011 |
| WO | WO 02/21027 | 3/2002 |

\* cited by examiner

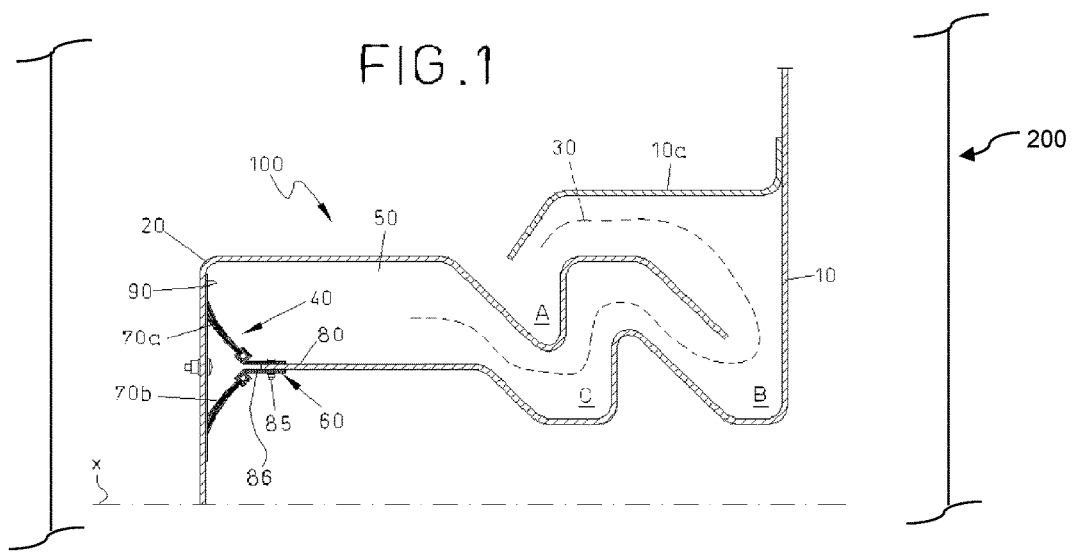
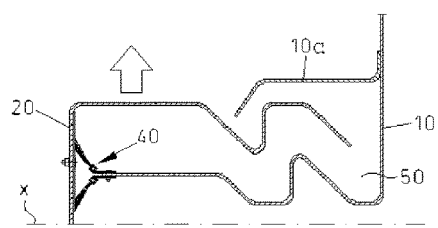
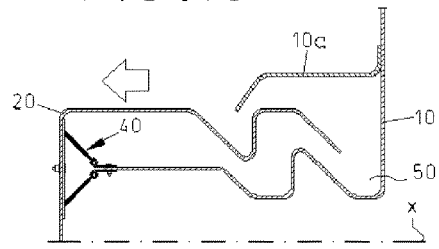
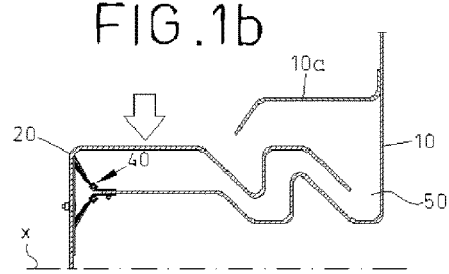
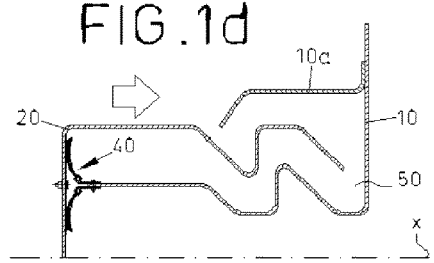

SEALING ASSEMBLY

This application claims the benefit of European Patent Application EP11382353 filed Nov. 17, 2011 and U.S. Provisional Patent Application Ser. No. 61/587,307 filed Jan. 17, 2012.

TECHNICAL FIELD

Examples are disclosed relating to sealing in wind turbine applications. Such examples are particularly suitable for sealing a gap existing between static and rotary parts in such wind turbine applications.

BACKGROUND

Full contact seals, such as lip seals, are widely known in rotating assemblies for joining mutually rotatable parts together in order to render the assembly substantially impervious or at least to reduce the flow of fluids or the passage of particles from one side of a seal to the other side of the seal to protect the system from damages caused by such fluids or particles.

In specific wind turbine applications, sealing between a stator, such as the nacelle, and a rotor, such as the hub, is an important issue for preventing the damage of the inner parts of the nacelle. In particular, in wind turbine applications it is important to prevent external agents from entering the nacelle through the gap between the hub and the nacelle as well as to prevent inside pressurized air leakage. In particular offshore applications, it is important to prevent external air and water from entering the nacelle.

In this respect, such full contact seals require well-machined friction surfaces in order to ensure a good surface contact for an efficient sealing. For this reason, full contact seals are not desirable in wind turbine applications in which large diameter parts are involved. In addition, high wear undergone by these types of seals result in undesirable weakening, particularly in the case of elastomeric seals such as rubber seals. Replacement of large seals is difficult, if at all possible, and very costly in wind turbine applications and specifically in offshore environments.

In order to overcome the problem of sealing in wind turbine applications, brush type seals have been proposed in the prior art. Brush seals have been proven to be a good solution for wind turbine applications involving large tolerances and surfaces having non-uniformities.

In this respect, document EP2306009 describes a seal arrangement intended to avoid grease leakage in wind turbine applications. This arrangement comprises two mutually rotatable parts and a brush type seal. The brush type seal is carried by one of the parts for sealing both parts when they are moved relative to each other.

Although this approach could be efficient, it does not however deal with the problem of ingress of external agents into the wind turbine such as external air and water and other elements that are present, especially in offshore or marine applications.

Labyrinth type seals have also used in wind turbine prior art applications. One example of this is disclosed in US2008246224. The seal arrangement disclosed in this document comprises a labyrinth seal arrangement intended to minimize bearing lubricant leakage in a radial direction. The labyrinth seal is arranged perpendicular to the axis of rotation of the rotor and includes a plurality of rings arranged concentrically in concentric grooves. This arrangement requires the use of a pumping gasket to prevent flow in the axial direction.

The problem with this kind of labyrinth seals in wind turbine applications where large sized parts are involved is that their manufacturing is capital intensive. Large pieces in wind turbine applications together with the vibrations produced when the wind turbine is in service render the use of labyrinth seals ineffective for the sealing of mutually rotatable parts, especially for air or pressurized air sealing.

In U.S. Pat. No. 6,010,132 the use of a labyrinth type seal with a brush type seal in a flow path between two relatively moving parts is combined. The labyrinth seal is formed by a plurality of teeth extending radially from one part toward the other part. The brush seal includes a plurality of bristles extending generally radially between said teeth.

Although this solution could be particularly useful in gas turbines that work under high inner pressures and temperatures, this is directed to systems in which the gap to be sealed with the brush, that is, the gap between the teeth, is reduced. For this reason, this construction is not effective for wind turbine applications where inner pressures are reduced and where large tolerances are involved due to the large size of the rotary parts.

Therefore, a need still remains for a sealing arrangement capable of ensuring an effective sealing between two mutually rotatable parts in wind turbine applications.

SUMMARY

A sealing assembly is herein disclosed. A wind turbine is also disclosed.

The present sealing assembly comprises a first member and a second member. The first member and the second member of the sealing assembly are mutually rotatable. The first member of the sealing assembly is part of or is attached to a wind turbine nacelle, that is, the first member may be a stationary member. The second member of the sealing assembly is part of or is attached to a wind turbine rotor hub that is, the second member may be a rotatable member. However, the present sealing assembly is also suitable for being used in other rotary mechanisms in a wind turbine such as the pitch blade and/or the yaw drive mechanisms in a wind turbine.

More specifically, the second member of the sealing assembly can be rotatable relative to the first member. A gap or tolerance is defined between the first member and the second member of the sealing assembly. Due to the large dimensions of both the first and second members of the sealing assembly (of the order of several meters), such gap or tolerance is considerably large (of the order of several centimeters).

The first member of the sealing assembly includes a plate attached thereto. This plate is arranged such that it substantially covers at least one portion of the second member. In one example, the plate may be arranged such that it covers an angle of 120° of the second member in the uppermost portion of the nacelle. The plate attached to the first member serves the purpose of avoiding direct ingress of water into the nacelle of the wind turbine.

The first member and the second member of the sealing assembly are shaped in a way that they both define at least one substantially tortuous way. This tortuous way defined inside the sealing arrangement results in a labyrinth path which preferably may comprise at least two changes of direction. This construction helps to prevent, or at least to hinder, external solids (dust, particles, etc.) and liquids (rain water, etc.) from entering inside the wind turbine nacelle.

In conjunction with the above mentioned tortuous way resulting in a labyrinth path defined inside the sealing assembly, a brush type sealing is further provided. The brush type sealing of the present sealing assembly may be at least partly made of polyamide. However, other similar materials may be suitably employed.

The brush type sealing has a first end and a second end opposite the first end. In general, the first end of the brush sealing is linked with the first member and the second end of the brush sealing is linked with the second member. However, arrangements in which the first end of the brush sealing is linked with the second member and the second end of the brush sealing is linked with the first member is also envisaged. The preferred example is an arrangement in which the first end of the brush sealing is attached to one end portion of the first member and the second end of the brush sealing substantially rests on the second member.

In this way, the gap or tolerance defined between the first and second members of the sealing assembly is effectively sealed. A barrier is further defined with this configuration in a way that air and other elements such as fine dust, water spray or the like are prevented from entering the first member even under radial and/or axial movements of the first and second members of the sealing assembly during operation of the wind turbine.

In some examples of the sealing assembly, the brush type sealing may comprise at least one set of bristles extending such that they substantially close the inner gap defined between the first and the second members. The bristles may be carried by a suitable support element.

Within the above definition of the sealing assembly, a first example is provided where the brush type sealing comprises one pair of sets of bristles extending such that they substantially close the inner gap defined between the first and the second members, that is, from one end portion of the first member to at least one sliding plate that is attached to or being part of the second member, as explained fully bellow. In this first example, radial and axial misalignments between the first member and the second members are compensated by flexibility of bristles themselves. The above mentioned support element carrying the bristles may be also flexible in order to further compensate for radial and axial misalignments between the first member and the second member.

A second example may be further provided within the above definition of the sealing assembly. In this second example of the sealing assembly, the brush type sealing comprises two pairs of sets of bristles. Each pair of sets of bristles extends between two opposite sliding plates. These two opposite sliding plates extend from the second member. In some examples, both sliding plates extend inside the sealing assembly perpendicular to an inner wall of the second member and parallel to each other. In this particular second example of the sealing assembly, axial misalignments are compensated by the bristles moving forward and away from the inner wall of the second member. Radial misalignments are compensated due to the provision of the flexible member.

As stated, the sliding plates in the examples above could be attached to the second member or they may be an integral part thereof. The sliding plates may be made of stainless steel so that the free ends of the bristles suitably rest and slide thereon when the second member is rotated relative to the first member. Other suitable materials are of course not ruled out.

It can be advantageous to provide the set or sets of bristles with a band running at least along some of them. This band may be provided between the bristles of the brush sealing for stiffening and airtight purposes.

In some cases, especially in the examples where the brush sealing comprises at least two pairs of sets of bristles, a flexible member may be fitted between the brush sealing and the first member for joining them in a flexible way. This flexible member may be a rubber strip suitable for allowing radial misalignment between the first and second members to be compensated.

A wind turbine is also provided comprising a nacelle and a rotor hub. The rotor hub has a portion that is rotatably mounted on a corresponding portion of the wind turbine nacelle. The present wind turbine is further provided with the above-described sealing assembly for sealing the gap formed between the portion of the nacelle and the portion of the rotor hub of the wind turbine.

The advantages of the present examples of the sealing arrangement and the wind turbine provided with it are mainly that water, air and/or other elements are effectively prevented from entering the first member. In case of air, this advantage is very important in offshore applications where marine atmosphere is very aggressive in terms of corrosion. This is also applicable even in desert wind turbine applications where sand or dust that are very aggressive for mechanics could enter the wind turbine and damage it.

Further advantages of the present examples of the sealing arrangement are that leakages of inner pressurized air are reduced. Pressurized air is a common practice in current offshore and onshore (desert climate) wind turbines to prevent outside air from entering the wind turbine through gaps and joints. In this respect, values of air pressure supplied from the inside of the nacelle can be decreased where the sealing arrangement herein disclosed is used in wind turbine applications.

In addition, the present examples of the sealing arrangement are advantageous in that they provide compliance against rotor instabilities and rotor-stator misalignments featuring self-alignment in wind turbine applications. The sealing of large rotor-stator gaps is therefore possible.

In addition, a further advantage of the present sealing arrangement is that rotor and stator manufacturing is cost effective as no machined parts are required.

Finally, it is to be noted that preventive-corrective maintenance of the brushes can be carried out from the inside of the wind turbine and consequently maintenance tasks safety is improved.

Additional objects, advantages and features of the present examples will become apparent to those skilled in the art upon examination of the description, or may be learned by practice thereof.

BRIEF DESCRIPTION OF THE DRAWINGS

Particular examples of the present sealing assembly will be described in the following. This description is provided by way of non-limiting examples with reference to the appended drawings.

In the drawings:

FIG. 1 is a half-seen half-section of a first example of the present sealing assembly;

FIGS. 1a-1d are corresponding half-seen half-sections of the first examples of the sealing assembly in FIG. 1 showing the radial and axial relative movements of the first and second members of the sealing assembly;

DETAILED DESCRIPTION OF EXAMPLES

Figure 2:
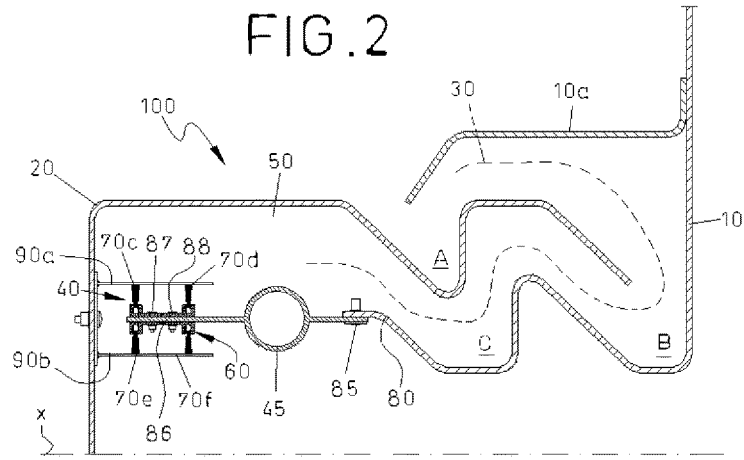
FIG. 2 is a half-seen half-section of a second example of the sealing assembly.

Referring now to the drawings, like reference numerals generally represent identical or corresponding parts throughout the figures. A sealing assembly indicated at 100 comprises a first member 10 and a second member 20. At least one of the first member 10 and the second member 20 can be made of glass reinforced plastics or similar materials suitable for wind turbine applications or the like.

In the example shown in the figures, the first member of the sealing assembly 100 corresponds to a part of a wind turbine nacelle 10 (of a wind turbine 200) and specifically to the connecting part that receives the rotor hub of the wind turbine 200. The second member 20 of the sealing assembly 100 corresponds to a part of a wind turbine rotor hub 20 and specifically to a part of the rotor hub 20 to be rotatably mounted to the wind turbine nacelle.

The first member 10 and the second member 20 of the sealing assembly 100 are mutually rotatable. In the examples shown in the examples of the drawings, the second member 20 of the sealing assembly 100 can be rotated relative to the first member 10 around an axis of rotation x. As shown in the figures, the axis of rotation x is the axis of revolution of both the first and the second members 10, 20 of the sealing assembly 100.

A gap or tolerance 50 is defined between the first member 10 and the second member 20 of the sealing assembly 100. Due to the particular large dimensions of the first and the second members 10, 20, the gap 50 is relatively large in size. The sealing assembly 100 is highly effective for a tight closure of gap 50 even during operation of the wind turbine in which the first and the second members 10, 20 axially and/or radially move to each other and therefore gap 50 is variable over time when in use.

As shown in the figures of the drawings, the first member 10 of the sealing assembly 100 includes a plate 10a attached thereto. The plate 10a is arranged such that it substantially covers at least one upper portion or segment of the second member 20. In other words, the plate 10a can extend over the entire angular length of the second member or only over a segment thereof, for example over a segment of 120° of the second member 20 in the uppermost portion of the nacelle. This avoids water direct ingress into the nacelle of the wind turbine.

The first member 10 and the second member 20 of the sealing assembly 100 are shaped in a way that a tortuous way is defined inside the sealing assembly 100. The tortuous way is depicted in the figures and indicated by dashed line 30. This tortuous way 30 defines a labyrinth exhibiting at least three main changes of direction inside the sealing assembly 100. The main changes of direction have been indicated at A, B, C in the figures. This labyrinth is particularly suitable for preventing external water from entering the first member 10 or at least for reducing the passage of water into the first member 10, i.e. inside the wind turbine. Further examples are possible in which the number of changes of direction inside the sealing assembly 100 are more than three, or even less.

The examples of the sealing assembly 100 further comprise a brush type sealing 40. The brush sealing 40 shown in the first example in FIGS. 1-1d comprises one pair of sets of bristles 70a, 70b. The bristles 70a, 70b in each pair extend such that they substantially close the inner gap 50 between the first member 10 and the second member 20. The bristles 70a, 70b are mounted in a pre-biased condition against an inner wall of the second member 20 of the sealing assembly 100.

The bristles 70a, 70b are preferably made of polyamide. Other suitable materials having a certain degree of flexibility could be alternatively used for the bristles 70a, 70b. The bristles 70a, 70b are carried by a suitable holding mechanism 60.

In the example shown in FIGS. 1-1d, the sets of bristles 70a, 70b are arranged inclined relative to each other. Both sets of bristles 70a, 70b are in turn inclined relative to the inner wall of the second member 20 as shown in FIG. 1.

The sets of bristles 70a, 70b comprise a first end. This first end is attached to one end portion 80 of the first member 10 by means of a holding mechanism 60. The holding mechanism 60 comprises a plate 86 and a screw-nut assembly 85. Other suitable holding mechanisms can be alternatively or additionally used. The sets of bristles 70a, 70b further comprise a second end that rests and presses on a sliding plate 90. The sliding plate 90 may be attached to or be part of the second member 20. The sliding plate 90 is made of stainless steel or any other material suitable so that the free ends of the bristles 70a, 70b rest and slide thereon, especially when the second member 20 is rotated relative to the first member 10, that is, when the wind turbine is in operation.

In this particular example, radial misalignments between the first member and the second member 10, 20 as shown in FIGS. 1a and 1b are efficiently compensated. Compensation for axial and radial misalignments is due to the flexibility of the bristles 70a, 7b themselves and to the width of the sliding plate 90. Axial and radial misalignments between the first member and the second member 10, 20 are also efficiently compensated as shown in FIGS. 1c and 1d.

Figure 2A:
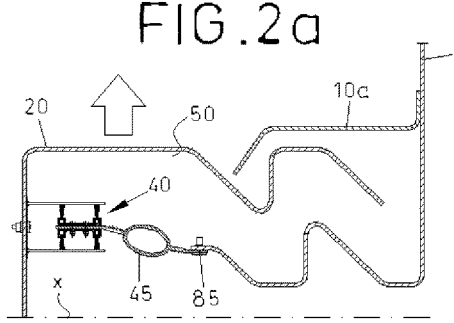
FIGS. 2a-2d are corresponding half-seen half-sections of the second example of the sealing assembly in FIG. 2 showing the radial and axial relative movements of the first and second members of the sealing assembly.
Figure 2C:
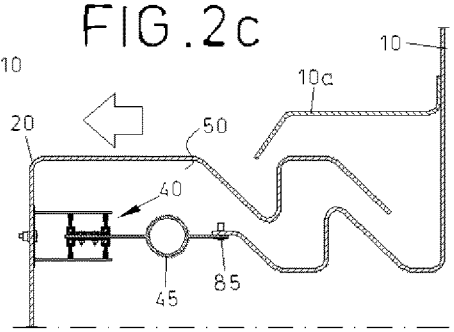
Figure 2B:
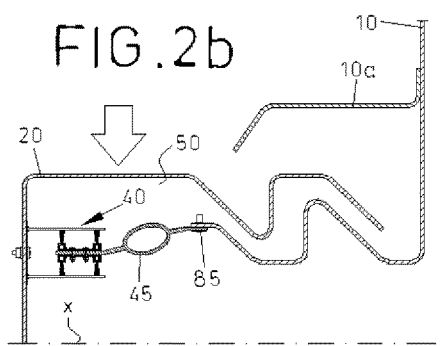
Figure 2D:
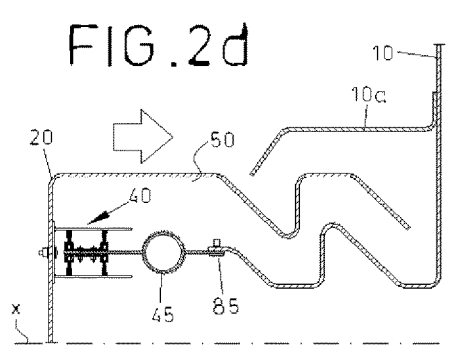

Reference is now made to an alternative example of the sealing assembly 100 shown in FIGS. 2-2d of the drawings. In this alternative example of the sealing assembly 100, the brush sealing 40 comprises two pairs of sets of bristles 70c, 70d, 70e, 70f made of polyamide. Other suitable materials having a certain degree of flexibility could be alternatively used for the bristles 70c, 70d, 70e, 70f.

The two pairs of sets of bristles 70c, 70d and 70e, 70f are arranged substantially vertical and parallel to each other, respectively. A flexible member 45 is provided between the brush sealing 40 and the first member 10 as shown in FIG. 2 of the drawings. The flexible member 45 joins the two pairs of sets of bristles 70c, 70d, 70e, 70f to the end portion 80 of the first member 10 in a flexible way. For this purpose, a screw-nut assembly 85 or any suitable fastening mechanism are provided at the end portion 80 of the first member 10.

The flexible member 45 carries the two pairs of sets of bristles 70c, 70d and 70e, 70f through a holding mechanism 60. A first example of such holding mechanism 60 for the example of the sealing assembly 100 of FIG. 2 is shown in said FIG. 2. The holding mechanism 60 in this first example comprises a plate 86 that is attached to the end portion 80 of first member 10. The plate 86 of the holding mechanism 60 carries the two pairs of sets of bristles 70c, 70d, 70e, 70f. The plate 86 of the holding mechanism 60 extends between the ends of sets of bristles 70c, 70d, 70e, 70f. The holding mechanism 60 further comprises at least two sets of screws 87, 88 provided in the plate between the sets of bristles 70c, 70d, 70e, 70f as shown in FIG. 2 of the drawings.

Figure 4:
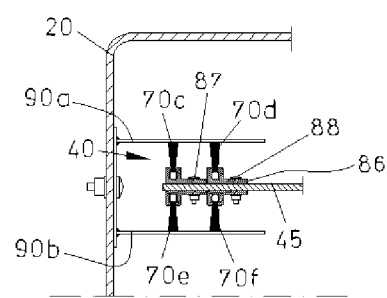
FIG. 4 is a sectional part view of a further variant of the second example of the sealing assembly, particularly relating to the way the brush sealing is attached to the flexible member.

A second example of the holding mechanism 60 is shown in FIG. 4. The holding mechanism 60 comprises, as in the first example of the holding mechanism 86, a plate that is attached to the end portion 80 of the first member 10. The plate carries the sets of bristles 70c, 70d, 70e, 70f and extends from the ends of one pair of sets of bristles 70c, 70e further towards the end portion 80 of the first member 10. In this example, a first set of screws 87 is provided in the plate between the sets of bristles 70c, 70e and 70d, 70f and a second set of screws 88 is provided in a portion of the plate extending beyond the sets of bristles 70d, 70f towards the end portion 80 of the first member 10 such as shown in FIG. 4 of the drawings.

In both example of the holding mechanism 60, corresponding nuts are provided for threadingly receiving the above mentioned screws 87, 88 for fastening the sets of bristles 70c, 70e and 70d, 70f to the flexible member 45.

The flexible member 45 may be for example a rubber strip suitable for allowing radial misalignment between the first and second members 10, 20 to be compensated.

In the example of the seal arrangement 100 shown in FIGS. 2-2d, two opposite parallel sliding plates 90a, 90b are provided. The sliding plates 90a, 90b extend substantially perpendicular to an inner wall of the second member 20. The sliding plates 90a, 90b are spaced apart and substantially parallel to each other. A clearance is defined between the sliding plates 90a, 90b. The two pairs of sets of bristles 70c, 70d, 70e, 70f each extend in said clearance, between both sliding plates 90a, 90b such that they substantially close the inner gap 50.

In this example, axial misalignments are compensated by the bristles 70c, 70d, 70e, 70f moving forward and away from the second member as shown in FIGS. 2c and 2d. Radial misalignments are compensated due to the flexibility of member 45 as shown in FIGS. 2a and 2b.

Although only a number of particular examples and examples of the sealing assembly have been disclosed herein, it will be understood by those skilled in the art that other alternative examples and/or uses and obvious modifications and equivalents thereof are possible. The present disclosure thus covers all possible combinations of the particular examples described.

Figure 3:
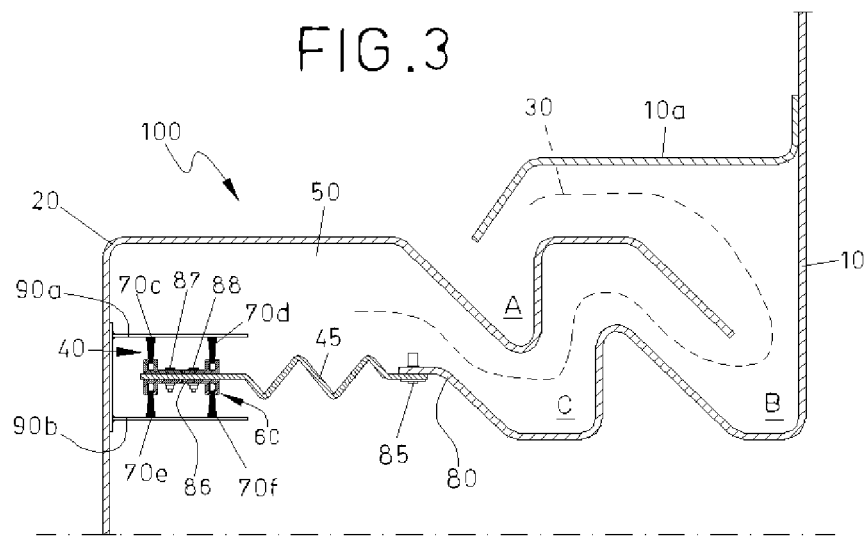
FIG. 3 is a half-seen half-section of a variant of the flexible member in the second example of the sealing assembly.

For example, the brush sealing 40 may comprise any suitable number of sets of bristles 70a-7d other than those disclosed above. In addition, the constructive characteristics of bristles 70a-7d such as their length, their relative inclination, etc. can be whatever according to the particular requirements. Such requirements are particularly in dependence upon the size of the parts involved and therefore the gap or tolerance to be sealed. On the other hand, the holding mechanism 86 used for attaching the bristles 70a, 70b to the first member 10 (in one example) or to the flexible member 45 (in an alternative example), could be replaced for any conventional mechanism suitable for fastening two elements to each other. In addition, the shape of the flexible member 45 for a proper accommodation of radial misalignments between the first and the second members 10, 20 may be straight in shape as shown in FIGS. 2-2d, or corrugated, as shown in FIG. 3. Other examples of the flexible member 45 than the rubber strip shown in the FIGS. 2-2d are also possible as long as they are suitable for allowing radial misalignment between the first and second members 10, 20 to be compensated.

On the other hand, the present sealing assembly could be also used in applications other than the nacelle-rotor hub connection where a sealing assembly is needed for sealing two rotary parts in the wind turbine both in onshore and offshore applications. The present sealing assembly is also suitable for an efficient sealing of the pitch blade and/or the yaw drive mechanisms in a wind turbine, for example. In these applications, and possibly many others, the present sealing assembly is suitable for efficiently reducing air, water or dust particles from entering the wind turbine.

The present disclosure should not be limited by particular examples, but should be determined only by a fair reading of the claims that follow.

The invention claimed is:

1. A sealing assembly comprising:
a first member that is part of or is attached to a wind turbine nacelle and extends in a longitudinal direction towards a wind turbine rotor hub, and
a second member that is part of or is attached to the wind turbine rotor hub and extends in a longitudinal direction towards the wind turbine nacelle;
the second member rotatable relative to the first member, the first member and the second member spaced apart and defining an inner gap therebetween, the inner gap defining a first portion of a tortuous gap,
a plate attached to the first member and extending in a longitudinal direction towards the wind turbine rotor hub, the plate spaced from the second member, wherein the plate and the second member define a second portion of the tortuous gap,
the sealing assembly further comprises a brush type sealing, the brush type sealing comprising:
a first set of bristles extending from an end of the first member at a first direction;
a second set of bristles extending from an opposite side of the end of the first member at a second direction that is opposite to the first direction; and
wherein the first and second sets of bristles create a seal between the end of the first member and the second member to seal the inner gap.

2. The sealing assembly as claimed in claim 1, further comprising a first sliding plate spaced from and parallel to a first side of the first member, and a second sliding plate spaced from and parallel to an opposite second side of the first member, the fast set of bristles extending transversely from the first side of the first member to the first sliding plate, and the second set of bristles extending transversely from the second side of the first member to the second sliding plate.

3. The sealing assembly as claimed in claim 2, wherein the brush type sealing is further provided with a band running at least along some of the bristles.

4. The sealing assembly as claimed in claim 2, further comprising a third set of bristles adjacent the first set of bristles and extending transversely to the first sliding plate, and a fourth set of bristles adjacent the second set of bristles and extending transversely to the second sliding plate.

5. The sealing assembly as claimed in claim 2, wherein the assembly further comprises a flexible member fitted to the end of the first member, the first and second sets of bristles extending transversely from opposite sides of the flexible member.

6. The sealing assembly as claimed in claim 5, wherein the flexible member comprises a rubber strip.

7. The sealing assembly as claimed in claim 5, wherein the flexible member is corrugated in shape.

8. The sealing assembly as claimed in claim 1, wherein the brush type sealing comprises a holding mechanism carrying the bristles.

9. The sealing assembly as claimed in claim 1, wherein the first portion of the tortuous gap comprises at least two changes of direction.

10. The sealing assembly as claimed in claim 1, wherein at least part of the brush type sealing is made of polyamide.

11. A wind turbine comprising a nacelle and a rotor hub, the hub having a portion that is rotatably mounted on a corresponding portion of the nacelle, wherein it is further provided with a sealing assembly suitable for sealing a gap formed between the portion of the nacelle and the portion of the hub, the sealing assembly comprising the sealing assembly of claim 1.

12. The sealing assembly as claimed in claim 1, wherein the first and second directions are oppositely inclined relative to the first member.

13. The sealing assembly as claimed in claim 1, wherein the first and second directions are perpendicular and opposite relative to the first member.

* * * * *